US006081974A

United States Patent [19]

McDaid

[11] Patent Number: 6,081,974

[45] Date of Patent: Jul. 4, 2000

[54] SECURITY ANCHOR FOR PORTABLE ARTICLES

[75] Inventor: Cornelius McDaid, Dorchester, Mass.

[73] Assignee: Kryptonite Corporation, Canton, Mass.

[21] Appl. No.: 09/334,570

[22] Filed: Jun. 21, 1999

[51] Int. Cl.$^{7}$ .............................. F16B 41/00; E05B 73/00

[52] U.S. Cl. ........................... 24/265 CD; 24/669; 24/95; 411/400

[58] Field of Search .............................. 24/265 CD, 669, 24/702, 3.1, 3.12, 3.13, 3.7, 3.5, 3.9, 590, 597, 573.1, 105, 90.1, 92–95, 682.1, 265 AL, 265 H; 248/225.11, 336, 229.16, 229.26; 52/125.4, 125.5, 705; 411/400, 345, 340; 70/58, 232, DIG. 57

[56] References Cited

U.S. PATENT DOCUMENTS 3,463,525 8/1969 Stewart .............................. 411/176 X
3,512,226 5/1970 Carlile ....................................... 24/669
4,490,065 12/1984 Ullrich et al. ...................... 411/400 X
4,704,772 11/1987 Kasai ....................................... 24/669
4,809,407 3/1989 Watanabe .................................... 24/95
5,447,045 9/1995 Cheng ......................................... 70/58
5,941,485 8/1999 Davidson et al. .................. 411/340 X

*Primary Examiner*—Anthony Knight
*Assistant Examiner*—Robert J. Sandy
*Attorney, Agent, or Firm*—Morse, Altman & Martin

[57] ABSTRACT

An anchor device for use with a security slot in a portable electronic article that provides an anchor for attaching a cable or other security device. The anchor device includes an internal member, an external member, and a securement for securing them together. The internal member includes a right angle portion inside the portable article that is approximately parallel to the inside wall. The external member has a clamping surface that abuts the outer surface of the portable article. The external member has an aperture into which the internal member fits and is secured either permanently or removably. The preferred removable securement is a screw that extends through the external member and into a threaded hole in the internal member. The securing device denies access to the screw when engaged with the external member. The external member provides an anchor for removably attaching the security device.

16 Claims, 3 Drawing Sheets

SECURITY ANCHOR FOR PORTABLE ARTICLES

BACKGROUND OF THE INVENTION

1. Field of the Invention

The present invention relates to security for portable articles, more particularly, to devices for the prevention of physical theft or removal of portable articles.

2. The Prior Art

As portable computers and other expensive electronic equipment have become more common, theft of such equipment has increased. There are a number of different types of devices on the market to deter such thefts. Most of these devices are either bulky, so that they are not particularly portable, or they rely on the small rectangular slot that is being manufactured into portable computers. The security devices that do not rely on the slot typically encase the portable article so that it cannot be operated while the security device is in use.

A number of locking devices have been developed to removably attach to the portable article using the slot. However, many of these devices are not particularly robust, generally relying on a thin cable lock for connection to a stationary fixture, such as a table. Thus, there continues to be a need for a device that allows a robust security attachment to a portable article that also allows the article to be operated normally.

SUMMARY OF THE INVENTION

An object of the present invention is to provide a device for use with a preexisting slot in a portable article that provides an anchor for a robust security device.

Another object is to provide an anchor device that allows the portable article to be used normally when the article is secured.

A further object is to provide an anchor device that can remain attached to the article when not in use.

The present invention is an anchor device for use with the security slot found on many portable electronic device, particularly laptop computers. The anchor device includes an internal member, an external member, and a means for securing the two together. The internal member extends into the security slot with a retaining portion that curves approximately 90° to approximately parallel with the inside wall of the portable article. The internal member includes an external member engagement portion that extends externally from the slot for securing to the external member.

The external member provides an anchor for attaching a lock, tether, or other security device. The external member has an aperture into which the external member engagement portion fits. Preferably, the external member engagement portion and aperture are keyed so that the external member cannot rotate about the internal member.

The external member has a clamping surface that abuts the outer surface of the portable article. The clamping surface extends completely around the slot or it may only extend as wings parallel to the retaining portion of the internal member.

The external member is secured to the internal member permanently, such as by weld, rivet, epoxy, and mating latches, etc., or removably. A removable securement must not be accessible when a security device is engaged with the external member. The preferred means of a removable securement is a screw that extends through the external member and into a threaded hole in the internal member. The external member is designed to deny access to the screw head when the securing device is engaged with the external member.

The external member provides an anchor for removably attaching the security device that will be used to secure the portable article to a stationary object, such as a table. There are several possible configurations contemplated by the present invention. A first configuration is knob with an annular groove. The security device has a mating groove that slides into the annular groove and that covers the screw head. A second configuration uses a ring through which a cable can be fed. A third configuration is rotatable shell held by a screw and washer. The shell includes a pair of coaxial apertures through which a cable can be fed.

The anchor device is installed by curling the internal member into the slot, fitting the external member aperture onto the external member engaging portion, and securing the external member to the internal member with the screw.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
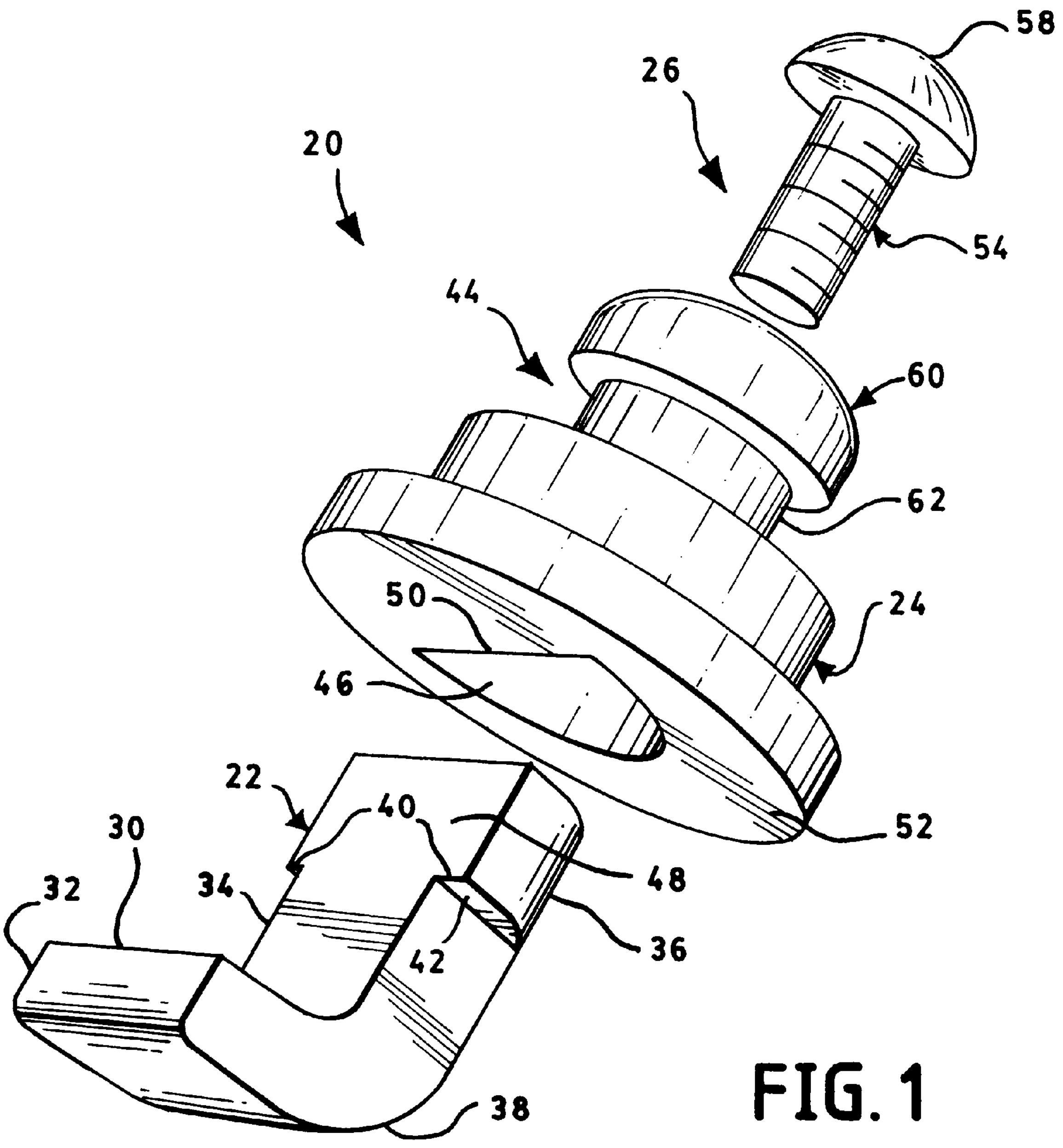
FIG. 1 is an exploded, perspective view of the security anchor of the present invention.

The security anchor 20 of the present invention is intended for use in conjunction with a generally rectangular slot 12 in the wall of the article 10 to be secured. These slots 12 are being manufactured into portable articles, such as laptop computers, in standard dimensions, which are known.

The anchor 20 of the present invention includes an internal member 22, an external member 24, and a means 26 for securing the two together. The internal member 22 includes a retaining portion 32, a slot engagement portion 34, and an external member engagement portion 36. The slot engagement portion 34 resides in the slot 12 when the anchor 20 is installed. The slot engagement portion 34 has a cross-sectional shape and size that are approximately the same as that of the slot 12 so that there is minimal movement of the internal member 22 within the slot 12 and portable article 10. The retaining portion 32 extends from slot engagement portion 34 at approximately a right angle, where the inner surface 30 of the retaining portion 32 makes contact with the inner surface 16 of the article 10 when the anchor 20 is installed. Preferably, the outer corner 38 of the junction of the slot engagement portion 34 and the retaining portion 32 is curved for ease in insertion into the slot 12, as described below.

Preferably, the external member retaining portion 36 includes ears 40 to prevent the internal member 22 from falling into the slot 12 while the anchor 20 is being installed. The ears 40 extend away from the external member retaining portion 36, providing surfaces 42 parallel to the outer surface 14 of the article 10, so that when the internal member 22 is inserted into the slot 12 for installation, the surfaces 42 block the internal member 22 from moving too far into the slot 12.

The external member 24 secures the internal member 22 into the slot 12 and provides an anchor 44 for attaching a lock, tether, or other security device. The external member 24 has an aperture 46 into which the external member engaging portion 36 is inserted. Preferably, the external member engaging portion 36 and aperture 46 are keyed in a complementary fashion so that the external member 24 cannot rotate about the internal member 22. If the external member 24 is allowed to so rotate and depending upon the manner in which the external member 24 and internal member 22 are secured together, it may be possible to remove the external member 24 when such is not desired. In one configuration, shown in FIG. 1, the key takes the form of a flat surface 48 on the external member engaging portion 36 and a mating flat surface 50 in the aperture 46.

The external member 24 includes a clamping surface 52 that abuts the outer surface 14 of the portable article 10 adjacent to the slot 12 when the anchor 20 is installed. In one configuration, the clamping surface 52 extends completely around the slot 12 in order to provide maximum strength to the anchor 20. Alternatively, if there is minimal clearance between the slot 12 and adjacent fixtures on the outer surface 14 of the portable article 10, the clamping surface 52 may only extend as wings 66 parallel to the retaining portion 32, as in FIG. 4.

The external member 24 is secured to the internal member 22 either permanently or removably. A permanent securement can be effected in any number of ways, including by weld, rivet, epoxy, and mating latches on the internal member 22 and external member 24. All appropriate ways of effecting a permanent securement are contemplated by the present invention.

The present invention also contemplates that a removable securement can be effected in any appropriate manner. One caveat is that the removable securement cannot be accessed when a lock, tether, or other device for securing the portable article is engaged with the external member 24. The preferred means to effect a removable securement is to use a screw 54 that extends into the aperture 46, which extends completely through the external member 24, and into a threaded hole 56 in the internal member 22. The external member 24 is designed to deny access to the screw head 58 by having the securing device cover enough of the aperture 46 to prevent removal of the screw 54.

The security anchor 20 of the present invention is held in the slot 12 by clamping the wall 18 of the portable article 10 between the retaining portion 32 and the clamping surface 52. Preferably, the wall 18 is tightly clamped so that any wear of the wall 18 in the vicinity of the slot 12 is minimized. The depth of the threaded hole 56 into which the screw 54 is turned allows for variation in the thickness of the article wall 18 from portable article to portable article. However, it is also contemplated that there will be situations where, regardless of the foreseen variations in the wall 18 thickness, the wall 18 will not be tightly clamped. In these situations, there will be some "play" between the retaining portion 32, the clamping surface 52, and wall 18.

Figure 2:
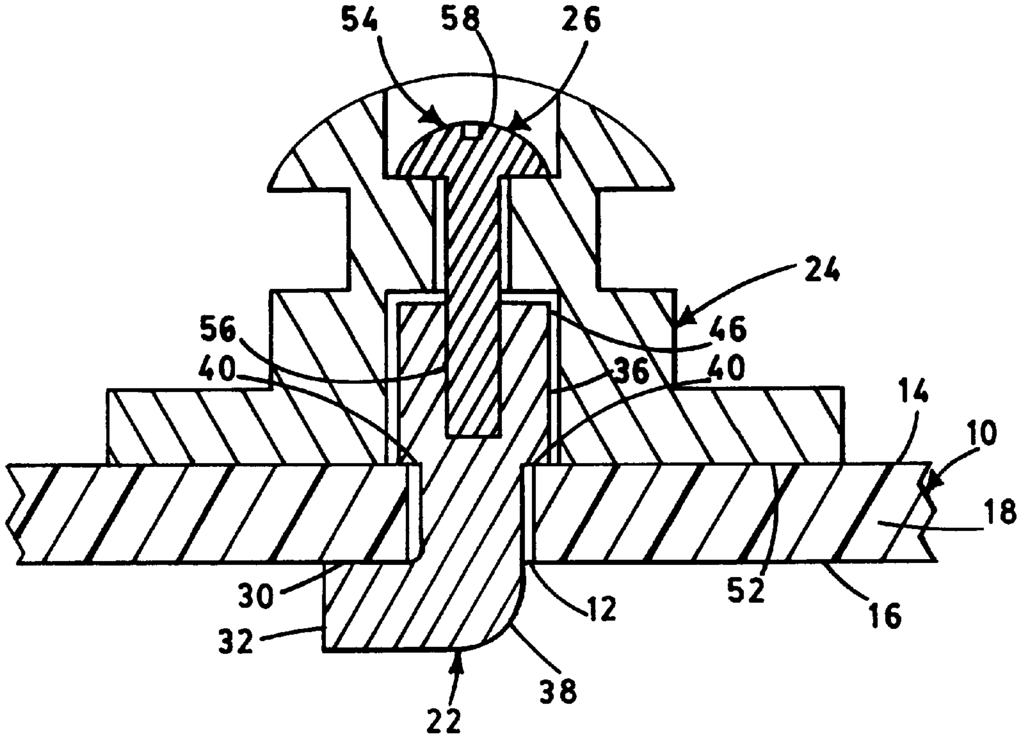
FIG. 2 is a cross-sectional side view of the security anchor of FIG. 1 installed in a portable article.
Figure 3:
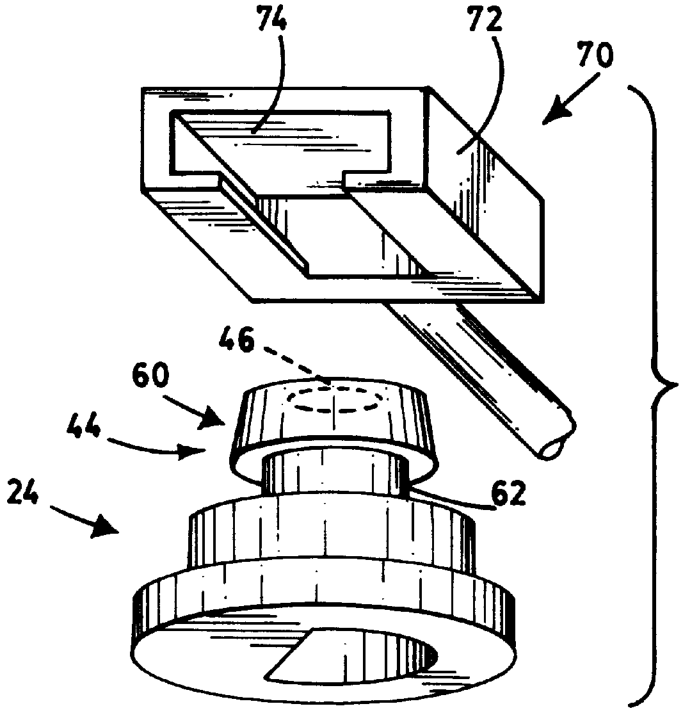
FIG. 3 is a partial phantom, perspective view of the external member of the security anchor of FIG. 1 with a mating security device.

The external member 24 provides an anchor 44 for removably attaching the security device that will be used to secure the portable article to a stationary object, such as a table. There are several possible configurations contemplated by the present invention. The first is shown in FIGS. 1–3 as a knob 60 with an annular groove 62. The security device 70 has a head 72 with a mating groove 74 that slides into the annular groove 62. The circular nature of the annular groove 62 allows the security device 70 to be attached from any direction. The security device head 72 covers the aperture 46 into which the screw 54 is inserted, preventing access to the removable securement.

Figure 4:
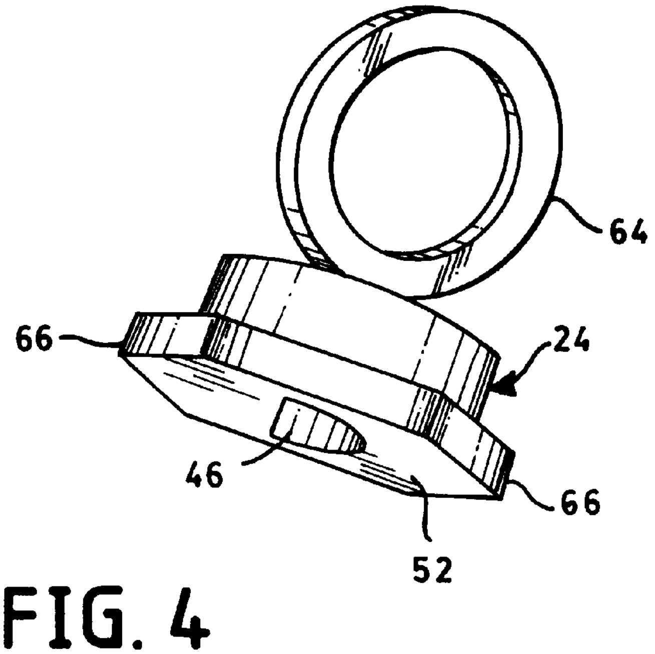
FIG. 4 is a perspective view of alternative configurations of several aspects of the external member including another configuration of the anchor.

A second configuration of the anchor 44, shown in FIG. 4, includes a ring 64. A tether or cable lock can be fed through the ring 64, where the tether or cable lock will deny access to the attaching screw 54.

Figure 5:
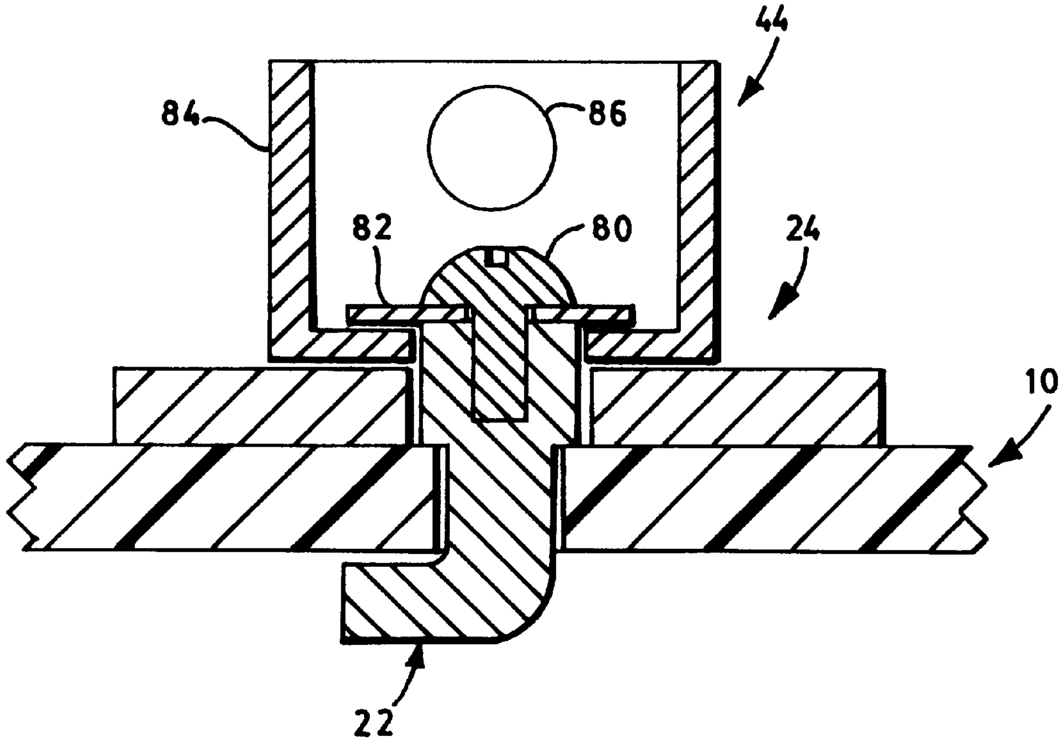
FIG. 5 is across-sectional side view of yet another configuration of the anchor.

A third configuration of the anchor 44, shown in FIG. 5, includes a screw 80 and washer 82 holding a rotatable shell 84. The shell 84 includes a pair of coaxial apertures 86 through which a tether or cable lock can be fed. The tether or cable lock prevents access to the screw 80 when installed.

The components of the anchor 20 are preferably composed of materials that cannot be easily disabled. In fact, the preferred materials are stronger than the plastic case of the typical portable article so that the case will be destroyed before the anchor 10 of the present invention.

The anchor device 20 of the present invention is installed by curling the retaining portion 32 and slot engaging portion 34 of the internal member 22 into the slot, 12, fitting the external member aperture 46 onto the external member engaging portion 36 of the internal member 22, and securing the external member 24 to the internal member 22 with the screw 58.

Thus it has been shown and described a portable article security anchor which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An anchor device adapted for use with a portable article having a standardized security slot, said anchor device comprising:

(a) an internal member and an external member;

(b) said internal member including a slot engaging portion, a retaining portion, and an external member engaging portion, said slot engaging portion adapted to reside within said slot, said retaining portion adapted to reside within said article and extending at an approximately right angle from said slot engaging portion for contact with said article;

(c) said external member including an anchor adapted to receive a security device and a clamping surface for contact with said article, an aperture in said clamping surface for receiving said external member engaging portion; and (d) a removable securement for securing said external member to said internal member, said securement being inaccessible when said security device is received by said anchor.

2. The anchor device of claim 1 wherein said anchor includes a rotatable shell having coaxial apertures adapted to receive said security device.

3. The anchor device of claim 1 wherein said securement includes said aperture extending through said external member and a removable screw extending through said aperture into a threaded hole in said internal member.

4. The anchor device of claim 1 wherein said internal member includes ears extending from said external member engaging portion, said ears adapted to prevent said external member engaging portion from entering said slot.

5. The anchor device of claim 1 wherein said clamping surface extends completely around said slot.

6. The anchor device of claim 1 wherein said clamping surface extends as wings parallel to said internal member retaining portion.

7. The anchor device of claim 1 wherein said anchor includes a knob with an annular groove.

8. The anchor device of claim 1 wherein said anchor includes a ring.

9. An anchor device adapted for use with a portable article having a standardized security slot, said anchor device comprising:

(a) an internal member and an external member;

(b) said internal member including a slot engaging portion, a retaining portion, and an external member engaging portion, said slot engaging portion adapted to reside within said slot, said retaining portion adapted to reside within said article and extending at an approximately right angle from said slot engaging portion for contact with said article, and said external member engaging portion including ears extending therefrom, said ears being adapted to prevent said external member engaging portion from entering said slot;

(c) said external member including an anchor adapted to receive a security device and a clamping surface for contact with said article, an aperture in said clamping surface for receiving said external member engaging portion; and (d) a securement for securing said external member to said internal member.

10. The anchor device of claim 9 wherein said anchor includes a rotatable shell having coaxial apertures adapted to receive said security device.

11. The anchor device of claim 9 wherein said securement is removable and is inaccessible when said security device is received by said anchor.

12. The anchor device of claim 11 wherein said securement includes said aperture extending through said external member and a removable screw extending through said aperture into a threaded hole in said internal member.

13. The anchor device of claim 9 wherein said clamping surface extends completely around said slot.

14. The anchor device of claim 9 wherein said clamping surface extends as wings parallel to said internal member retaining portion.

15. The anchor device of claim 9 wherein said anchor includes a knob with an annular groove.

16. The anchor device of claim 9 wherein said anchor includes a ring.

* * * * *